United States Patent
Kaptur et al.

(10) Patent No.: US 10,922,482 B1
(45) Date of Patent: *Feb. 16, 2021

(54) PASSING FUNCTIONAL SPREADSHEET DATA BY REFERENCE

(71) Applicant: Google LLC, Mountain View, CA (US)

(72) Inventors: Joseph J. Kaptur, New York, NY (US); Zachary E. Lloyd, Brooklyn, NY (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/532,458

(22) Filed: Aug. 5, 2019

Related U.S. Application Data

(63) Continuation of application No. 13/711,819, filed on Dec. 12, 2012, now Pat. No. 10,372,808.

(51) Int. Cl.
*G06F 15/00* (2006.01)
*G06F 40/18* (2020.01)

(52) U.S. Cl.
CPC .................... *G06F 40/18* (2020.01)

(58) Field of Classification Search
CPC ........................................................ G06F 40/18
(Continued)

(56) References Cited

U.S. PATENT DOCUMENTS 5,307,484 A 4/1994 Baker et al.
5,345,516 A 9/1994 Boyer et al.
(Continued)

FOREIGN PATENT DOCUMENTS

EP 1054329 A2 11/2000
WO 2012087418 A1 6/2012

OTHER PUBLICATIONS

Mynda Treacy, Excel Factor 12 Secret Evaluate Function, Aug. 29, 2012, pp. 2-3. (Year: 2012).*

(Continued)

*Primary Examiner* — Scott T Baderman
*Assistant Examiner* — Hassan Mrabi
(74) *Attorney, Agent, or Firm* — Lowenstein Sandler LLP

(57) ABSTRACT

A method of processing data represented as an electronic spreadsheet includes identifying a first cell of a first sheet of the electronic spreadsheet, the first cell having a first cell identifier and including a formula having a first function call, the first function call including an argument having a plurality of formula elements that comprise a second cell identifier. The method further includes identifying, based on the second cell identifier, a second cell that includes a function identifier, and identifying a value of the second cell, wherein the value of the second cell is a string corresponding to a function name corresponding to a second function call to be used in the argument of the first function call. The method further includes determining a result of the formula using the function identifier and the string, wherein the determining comprises performing the first function call to convert the string into the second function call, and performing the second function call to derive the result of the formula. The method further includes causing the result of the formula to be displayed in the first cell of the first sheet of the electronic spreadsheet.

21 Claims, 7 Drawing Sheets

(58) Field of Classification Search
USPC .......................................................... 715/215
See application file for complete search history.

(56) References Cited

U.S. PATENT DOCUMENTS

| | | | |
|---|---|---|---|
| 5,371,675 | A | 12/1994 | Greif et al. |
| 5,416,895 | A | 5/1995 | Anderson et al. |
| 5,600,584 | A | 2/1997 | Schlafly |
| 5,603,021 | A | 2/1997 | Spencer et al. |
| 5,706,449 | A | 1/1998 | Liu et al. |
| 5,809,317 | A | 9/1998 | Kogan et al. |
| 5,842,180 | A | 11/1998 | Khanna et al. |
| 5,910,802 | A | 6/1999 | Shields et al. |
| 5,950,168 | A | 9/1999 | Simborg et al. |
| 6,055,550 | A | 4/2000 | Wallack |
| 6,204,846 | B1 | 3/2001 | Little et al. |
| 6,205,453 | B1 | 3/2001 | Tucker et al. |
| 6,317,758 | B1 | 11/2001 | Madsen et al. |
| 6,430,574 | B1 | 8/2002 | Stead |
| 6,437,812 | B1 | 8/2002 | Giles et al. |
| 6,711,715 | B1 | 3/2004 | Grealish |
| 6,734,883 | B1 | 5/2004 | Wynn et al. |
| 6,738,084 | B1 | 5/2004 | Kelley et al. |
| 6,751,603 | B1 | 6/2004 | Bauer et al. |
| 6,778,192 | B2 | 8/2004 | Arbab et al. |
| 6,828,988 | B2 | 12/2004 | Hudson et al. |
| 6,889,223 | B2 | 5/2005 | Hattori et al. |
| 6,978,443 | B2 | 12/2005 | Flanagan et al. |
| 6,988,241 | B1 | 1/2006 | Guttman et al. |
| 7,009,609 | B2 | 3/2006 | Miyadai |
| 7,085,755 | B2 | 8/2006 | Bluhm et al. |
| 7,101,779 | B2 | 9/2006 | Vaartstra et al. |
| 7,117,430 | B2 | 10/2006 | Maguire, III et al. |
| 7,117,450 | B1 | 10/2006 | Chaudhri |
| 7,266,763 | B2 | 9/2007 | Peyton-Jones et al. |
| 7,275,207 | B2 | 9/2007 | Aureglia et al. |
| 7,451,397 | B2 | 11/2008 | Weber et al. |
| 7,546,523 | B2 | 6/2009 | Aureglia et al. |
| 7,707,486 | B2 | 4/2010 | Genesereth et al. |
| 7,752,148 | B2 | 7/2010 | Yu et al. |
| 7,873,946 | B2 | 1/2011 | Lathrop et al. |
| 8,130,205 | B2 | 3/2012 | Forstall et al. |
| 8,234,293 | B2 | 7/2012 | Martynov et al. |
| 8,280,722 | B1 | 10/2012 | Harik et al. |
| 8,332,748 | B1 | 12/2012 | Karam |
| 8,386,926 | B1 | 2/2013 | Matsuoka |
| 8,412,749 | B2 | 4/2013 | Fortuna et al. |
| 8,601,019 | B1 | 12/2013 | Weininger et al. |
| 8,615,707 | B2 | 12/2013 | Fortuna et al. |
| 8,645,825 | B1 | 2/2014 | Cornea et al. |
| 2002/0023105 | A1 | 2/2002 | Wisniewski |
| 2002/0143809 | A1 | 10/2002 | Bennett |
| 2002/0169799 | A1 | 11/2002 | Voshell |
| 2002/0186252 | A1 | 12/2002 | Himmel et al. |
| 2002/0194095 | A1 | 12/2002 | Koren |
| 2003/0188257 | A1 | 10/2003 | Aureglia et al. |
| 2003/0226105 | A1 | 12/2003 | Waldau |
| 2004/0103366 | A1* | 5/2004 | Peyton-Jones ........ G06F 40/18 715/213 |
| 2004/0107277 | A1 | 6/2004 | Levesque et al. |
| 2005/0091604 | A1 | 4/2005 | Davis |
| 2005/0183017 | A1 | 8/2005 | Cain |
| 2005/0210403 | A1 | 9/2005 | Satanek |
| 2006/0036939 | A1 | 2/2006 | Hobbs et al. |
| 2006/0070002 | A1 | 3/2006 | Guido et al. |
| 2006/0074866 | A1 | 4/2006 | Chamberlain et al. |
| 2006/0107226 | A1 | 5/2006 | Matthews et al. |
| 2006/0117051 | A1 | 6/2006 | Chin |
| 2006/0161844 | A1* | 7/2006 | Simkhay ............... G06F 40/18 715/212 |
| 2006/0184901 | A1 | 8/2006 | Dietz |
| 2006/0224946 | A1 | 10/2006 | Barrett et al. |
| 2006/0288267 | A1 | 12/2006 | DeSpain |
| 2007/0016872 | A1 | 1/2007 | Cummins et al. |
| 2007/0033518 | A1 | 2/2007 | Kenna et al. |
| 2007/0083541 | A1 | 4/2007 | Fraleigh et al. |
| 2007/0130503 | A1 | 6/2007 | Voshell |
| 2007/0153897 | A1 | 7/2007 | Yan |
| 2007/0234195 | A1 | 10/2007 | Wells |
| 2007/0244672 | A1* | 10/2007 | Kjaer ................... G06F 40/18 703/2 |
| 2008/0028340 | A1 | 1/2008 | Davis |
| 2008/0155464 | A1 | 6/2008 | Jones et al. |
| 2008/0229184 | A1 | 9/2008 | Prish et al. |
| 2008/0238938 | A1 | 10/2008 | Eklund et al. |
| 2009/0158139 | A1 | 6/2009 | Morris et al. |
| 2009/0187816 | A1 | 7/2009 | Aureglia et al. |
| 2009/0287673 | A1 | 11/2009 | Chronister et al. |
| 2009/0325607 | A1 | 12/2009 | Conway et al. |
| 2011/0066933 | A1 | 3/2011 | Ludwig |
| 2011/0148789 | A1 | 6/2011 | Kim et al. |
| 2011/0179110 | A1 | 7/2011 | Soloway |
| 2011/0283227 | A1 | 11/2011 | Moore et al. |
| 2012/0137203 | A1* | 5/2012 | Schodl .................. G06F 40/18 715/215 |
| 2013/0036346 | A1 | 2/2013 | Cicerone |

OTHER PUBLICATIONS

Treacy, Mynda; "Excel Factor 12 Secret Evaluate Functions"; <https://www.myonlinetraininghub.com/excel-factor-12-secret-evaluate-function> Aug. 29, 2012.

Wallace, Thomas Michael; "Evaluate: Excel's Dirty Secret"; http://www.beingbrunel.com/evaluate-excels-dirty-secret/ Jun. 4, 2016.

Abraham et al., "How to Communicate Unit Error Message in Spreadsheets" First Workshop on End User Software Engineering, May 21, 2005, St. Louis, Missouri, p. 1-5.

Clark, iWork'09: The Missing Manual, O'Reilly Media, Inc., Apr. 24, 2009, Chapter 20, Using Formulas, 44 pages.

StackOverflow, "Are there such things as variables within an Excel formula?." 2009.

Actuarial Outpost, Discussion Forum "Excel: Conditional Tab Colors," http://www.actuarialoutpost.com/actuarial_discussion_forum/show1thread.php?t=220776, Jul. 2011.

Auto-Hide the Taskbar in Windows P, Apr. 12, 2006, 3 pages, http://www.xp-tips.com/auto-hide-taskbar-.html.

Bankoski et al. "Technical Overview of VP8, An Open Source Video Codec for the Web". Dated Jul. 11, 2011.

Bankoski et al. "VP8 Data Format and Decoding Guide" Independent Submission. RFC 6389, Dated Nov. 2011.

Bankoski et al. "VP8 Data Format and Decoding Guide; draft-bankoski-vp8-bitstream-02" Network Working Group. Internet-Draft, May 18, 2011, 288 pp.

David Pogue, "iPhone: The Missing Manual, Forth Edition," Aug. 2010.

Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.

Microsoft Excell 2003, "Creating Custom functions".

Mozilla, "Introduction to Video Coding Part 1: Transform Coding", Video Compression Overview, Mar. 2012, 171 pp.

Overview; VP7 Data Format and Decoder. Version 1.5. On2 Technologies, Inc. Dated Mar. 28, 2005.

Product Feature Tour, Visual Studio Style, Auto Hide Control Bars, Mar. 9, 2004, 2 pages, http://www.bcgsoft.com/featuretour/tour156.htm.

Series H: Audiovisual and Multimedia Systems; Infrastructure of audiovisual services—Coding of moving video. H.264. Advanced video coding for generic audiovisual services. International Telecommunication Union. Version 11. Dated Mar. 2009.

Series H: Audiovisual and Multimedia Systems; Infrastructure of audiovisual services—Coding of moving video H.264. Advanced video coding for generic audiovisual services. International Telecommunication Union. Version 12. Dated Mar. 2010.

Series H: Audiovisual and Multimedia Systems; Infrastructure of audiovisual services—Coding of moving video. H.264. Amendment 2: New profiles for professional applications. International Tele-

(56) References Cited

OTHER PUBLICATIONS communication Union. Dated Apr. 2007.
Series H: Audiovisual and Multimedia Systems; Infrastructure of audiovisual services—Coding of moving video. H264. Advanced video coding for generic audiovisual services. Version 8. International Telecommunication Union. Dated Nov. 1, 2007.
Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.
Series H: Audiovisual and Multimedia Systems; Infrastructure of audiovisual services—Coding of moving video; Advanced video coding for generic audiovisual services. H.264. Version 1. International Telecommunication Union. Dated May 2003.
Series H: Audiovisual and Multimedia Systems; Infrastructure of audiovisual services—Coding of moving video; Advanced video coding for generic audiovisual services. H.264. Version 3. International Telecommunication Union. Dated Mar. 2005.
VP6 Bitstream & Decoder Specification. Version 1.02. On2 Technologies, Inc. Dated Aug. 17, 2006.
VP6 Bitstream & Decoder Specification. Version 1.03. On2 Technologies, Inc. Dated Oct. 29, 2007.
VP8 Data Format and Decoding Guide. WebM Project. Google On2. Dated: Dec. 1, 2010.
Wayne Pan, "JavaScript Pull to Refresh," Jul. 2010.
Teknomo, K. "How to use MS Excel Iterations", 2006, pp. 1-5.
Pearson, "The Indirect Function", 1999, pp. 1-2.
Excel 2003-2013, "Named Ranges in Excel".

\* cited by examiner

| | 422—A | B |
|---|---|---|
| 1 | | 27 |
| 2 | =27 | 27 |
| 3 | ="27" | 27 |
| 4 | =A1 | 27 |
| 5 | =26 + 1 | 27 |
| 6 | ="2" & "7" | 27 |
| 7 | =AVERAGE(26, 27, 28) | 27 |
| 8 | =SUM(A1:A2) | 54 |
| 9 | =AVERAGE(SUM(A1:A2), A8) | 54 |
| 10 | | |

SHEET1  SHEET2

| | A | B | | | | | | | | |
|---|---|---|---|---|---|---|---|---|---|---|
| 1 | COMPANY A | AVERAGE | | | | | | | | |
| 2 | 3 | =EVAL(B1 & "(" & A1 & "!C1:C5")) | | | | | | | | |
| 3 | | | | | | | | | | |
| 4 | | | | | | | | | | |
| 5 | | | | | | | | | | |
| 6 | | | | | | | | | | |
| 7 | | | | | | | | | | |
| 8 | | | | | | | | | | |
| 9 | | | | | | | | | | |
| 10 | | | | | | | | | | |

DASHBOARD | COMPANYA | COMPANYB

604

| | A | B | C |
|---|---|---|---|
| 1 | | | 1 |
| 2 | | | 2 |
| 3 | | | 3 |
| 4 | | | 4 |
| 5 | | | 5 |

DASHBOARD | COMPANYA | COMPANYB

606

| | A | B | C |
|---|---|---|---|
| 1 | | | 6 |
| 2 | | | 7 |
| 3 | | | 8 |
| 4 | | | 9 |
| 5 | | | 10 |

DASHBOARD | COMPANYA | COMPANYB

PASSING FUNCTIONAL SPREADSHEET DATA BY REFERENCE

RELATED APPLICATIONS

This application is a continuation application of co-pending U.S. patent application Ser. No. 13/711,819, filed Dec. 12, 2012, which is herein incorporated by reference.

TECHNICAL FIELD

This application relates to computer implemented applications, particularly displaying information in an electronic representation of a document such as an electronic spreadsheet.

BACKGROUND

Spreadsheet documents may be used for organizing and analyzing large amounts of information. Information in a spreadsheet document may be contained in cells, arranged as rows and columns on one or more sheets. For example, spreadsheets may be used for managing and manipulating financial information, engineering information, or any organizational information.

Electronic spreadsheet applications allow users to conveniently and efficiently organize and manage spreadsheet documents using a relatively simple syntax, without the use of a complex programming language. Limitations of the spreadsheet syntax prevent users from performing some calculations without resorting to complex external resources, such as macros. Accordingly, it would be advantageous to provide a method and apparatus for passing functional spreadsheet data by reference in an electronic spreadsheet application.

SUMMARY

Disclosed herein are aspects of systems, methods, and apparatuses for passing functional spreadsheet data by reference.

An aspect is a method that includes identifying information associated with a first cell of a first sheet of an electronic spreadsheet, the information associated with the first cell including a formula, the formula including a function call, the function call including an argument, the argument indicating a cell identifier associated with a second cell, wherein the second cell is one of a plurality of cells in the first sheet or the second cell is one of a plurality of cells in a second sheet of the electronic spreadsheet; identifying information associated with the second cell, the information associated with the second cell including a function identifier; determining, by a processor in response to instructions stored on a tangible non-transitory computer readable medium, a result of the formula based on the function identifier; and transmitting information including the result of the formula for display in the first cell.

Another aspect is an apparatus for use in passing functional spreadsheet data by reference. The apparatus includes a memory and at least one processor configured to execute instructions stored in the memory to identify information associated with a first cell of a first sheet of an electronic spreadsheet, the information associated with the first cell including a formula, the formula including a function call, the function call including an argument, the argument indicating a cell identifier associated with a second cell, wherein the second cell is one of a plurality of cells in the first sheet or the second cell is one of a plurality of cells in a second sheet of the electronic spreadsheet; identify information associated with the second cell, the information associated with the second cell including a function identifier; determine a result of the formula based on the function identifier; and transmit information including the result of the formula for display in the first cell.

Variations in these and other aspects will be described in additional detail hereafter.

BRIEF DESCRIPTION OF THE DRAWINGS

The description herein makes reference to the accompanying drawings wherein like reference numerals refer to like parts throughout the several views, and wherein:

FIG. 4 is a diagram of a representation of spreadsheet information as an electronic spreadsheet in an electronic spreadsheet application in accordance with some implementations of this disclosure;

FIG. 5 is a diagram of a representation of spreadsheet information as an electronic spreadsheet in an electronic spreadsheet application using the INDIRECT function in accordance with implementations of this disclosure;

FIG. 6 is a diagram of a representation of spreadsheet information as an electronic spreadsheet in an electronic spreadsheet application using the EVAL function in accordance with implementations of this disclosure.

DETAILED DESCRIPTION

Spreadsheets may be used for manipulating, organizing, and analyzing large amounts of information in a relatively low complexity paradigm. For example, a spreadsheet may include financial, engineering, or organizational information. An electronic spreadsheet application may allow a user to manipulate, organize, and analyze information in a representation of a spreadsheet quickly and easily using a relatively simple syntax that does not rely upon the use or understanding of relatively complex programming languages or appendant applications, such as macros and add-ons, which may be difficult to create and use and may pose security risks.

In an electronic spreadsheet, a cell may include a formula that includes instructions that the electronic spreadsheet application may perform to determine information for manipulating the spreadsheet data and displaying a representation of the spreadsheet. The functionality that may be included in a formula and calculated by an electronic spreadsheet may be limited. For example, in some implementations, an electronic spreadsheet application may treat a cell identifier in a formula as a reference to discrete data.

Passing functional spreadsheet data by reference as part of an electronic spreadsheet application may increase the functionality available for using spreadsheets without substantially increasing security vulnerabilities and without requiring users to use and understand a more complex programming language. For example, an electronic spreadsheet application configured to pass functional spreadsheet data by reference may be configured to calculate a result of a formula that includes a cell identifier as a reference to functional information, such as a formula, part of a formula, a function, or part of a function, in another cell.

Figure 1:
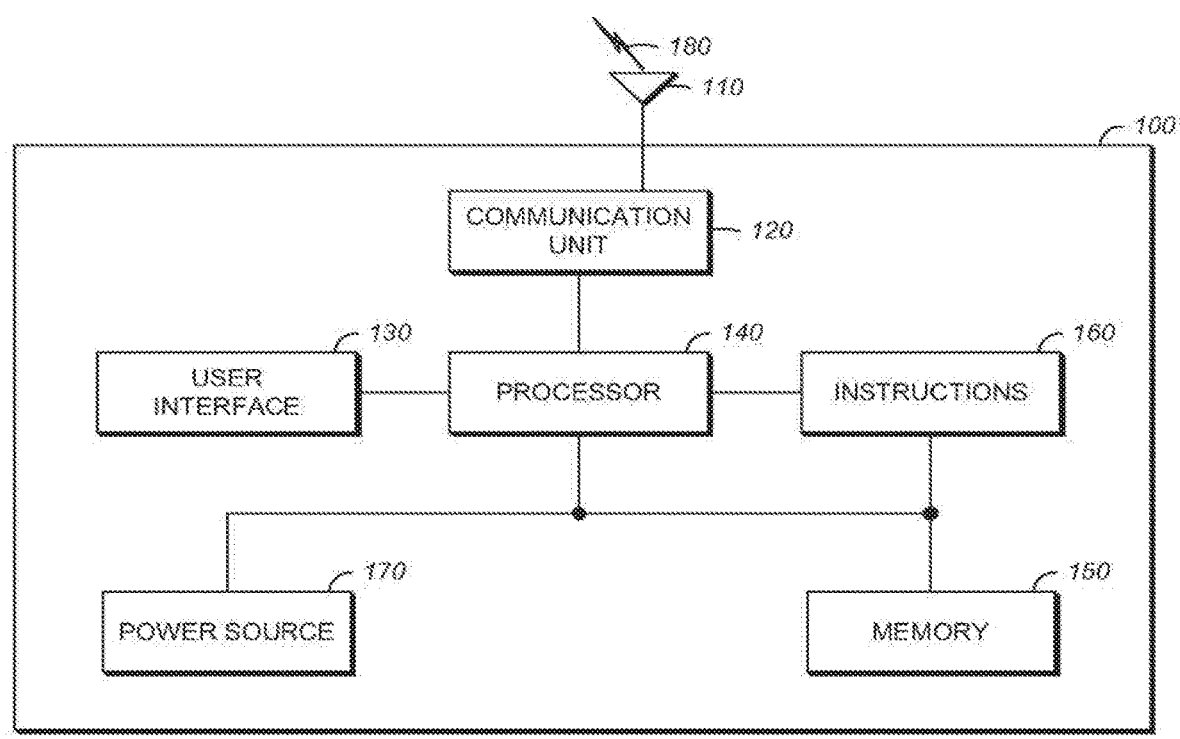
FIG. 1 is a diagram of a computing device in accordance with implementations of this disclosure.

FIG. 1 is a diagram of a computing device 100 in accordance with implementations of this disclosure. A computing device 100 can include a communication interface 110, a communication unit 120, a user interface (UI) 130, a processor 140, a memory 150, instructions 160, a power source 170, or any combination thereof. As used herein, the term "computing device" includes any unit, or combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one or more element of the communication device 100 can be integrated into any number of separate physical units. For example, the UI 130 and processor 140 can be integrated in a first physical unit and the memory 150 can be integrated in a second physical unit.

The communication interface 110 can be a wireless antenna, as shown, a wired communication port, such as an Ethernet port, an infrared port, a serial port, or any other wired or wireless unit capable of interfacing with a wired or wireless electronic communication medium 180.

The communication unit 120 can be configured to transmit or receive signals via a wired or wireless medium 180. For example, as shown, the communication unit 120 is operatively connected to an antenna configured to communicate via wireless signals. Although not explicitly shown in FIG. 1, the communication unit 120 can be configured to transmit, receive, or both via any wired or wireless communication medium, such as radio frequency (RF), ultra violet (UV), visible light, fiber optic, wire line, or a combination thereof. Although FIG. 1 shows a single communication unit 120 and a single communication interface 110, any number of communication units and any number of communication interfaces can be used.

The UI 130 can include any unit capable of interfacing with a user, such as a virtual or physical keypad, a touchpad, a display, a touch display, a speaker, a microphone, a video camera, a sensor, or any combination thereof. The UI 130 can be operatively coupled with the processor, as shown, or with any other element of the communication device 100, such as the power source 170. Although shown as a single unit, the UI 130 may include one or more physical units. For example, the UI 130 may include an audio interface for performing audio communication with a user, and a touch display for performing visual and touch based communication with the user. Although shown as separate units, the communication interface 110, the communication unit 120, and the UI 130, or portions thereof, may be configured as a combined unit. For example, the communication interface 110, the communication unit 120, and the UI 130 may be implemented as a communications port capable of interfacing with an external touchscreen device.

The processor 140 can include any device or system capable of manipulating or processing a signal or other information now-existing or hereafter developed, including optical processors, quantum processors, molecular processors, or a combination thereof. For example, the processor 140 can include a general purpose processor, a special purpose processor, a conventional processor, a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors. The processor can be operatively coupled with the communication interface 110, communication unit 120, the UI 130, the memory 150, the instructions 160, the power source 170, or any combination thereof.

The memory 150 can include any non-transitory computer-usable or computer-readable medium, such as any tangible device that can, for example, contain, store, communicate, or transport the instructions 160, or any information associated therewith, for use by or in connection with the processor 140. The non-transitory computer-usable or computer-readable medium can be, for example, a solid state drive, a memory card, removable media, a read only memory (ROM), a random access memory (RAM), any type of disk including a hard disk, a floppy disk, an optical disk, a magnetic or optical card, an application specific integrated circuits (ASICs), or any type of non-transitory media suitable for storing electronic information, or any combination thereof. The memory 150 can be connected to, for example, the processor 140 through, for example, a memory bus (not explicitly shown).

The instructions 160 can include directions for performing any method, or any portion or portions thereof, disclosed herein. The instructions 160 can be realized in hardware, software, or any combination thereof. For example, the instructions 160 may be implemented as information stored in the memory 150, such as a computer program, that may be executed by the processor 140 to perform any of the respective methods, algorithms, aspects, or combinations thereof, as described herein. The instructions 160, or a portion thereof, may be implemented as a special purpose processor, or circuitry, that can include specialized hardware for carrying out any of the methods, algorithms, aspects, or combinations thereof, as described herein. Portions of the instructions 160 can be distributed across multiple processors on the same machine or different machines or across a network such as a local area network, a wide area network, the Internet, or a combination thereof.

The power source 170 can be any suitable device for powering the communication device 110. For example, the power source 170 can include a wired power source; one or more dry cell batteries, such as nickel-cadmium (NiCd), nickel-zinc (NiZn), nickel metal hydride (NiMH), lithium-ion (Li-ion); solar cells; fuel cells; or any other device capable of powering the communication device 110. The communication interface 110, the communication unit 120, the UI 130, the processor 140, the instructions 160, the memory 150, or any combination thereof, can be operatively coupled with the power source 170.

Although shown as separate elements, the communication interface 110, the communication unit 120, the UI 130, the processor 140, the instructions 160, the power source 170, the memory 150, or any combination thereof can be integrated in one or more electronic units, circuits, or chips.

Figure 2:
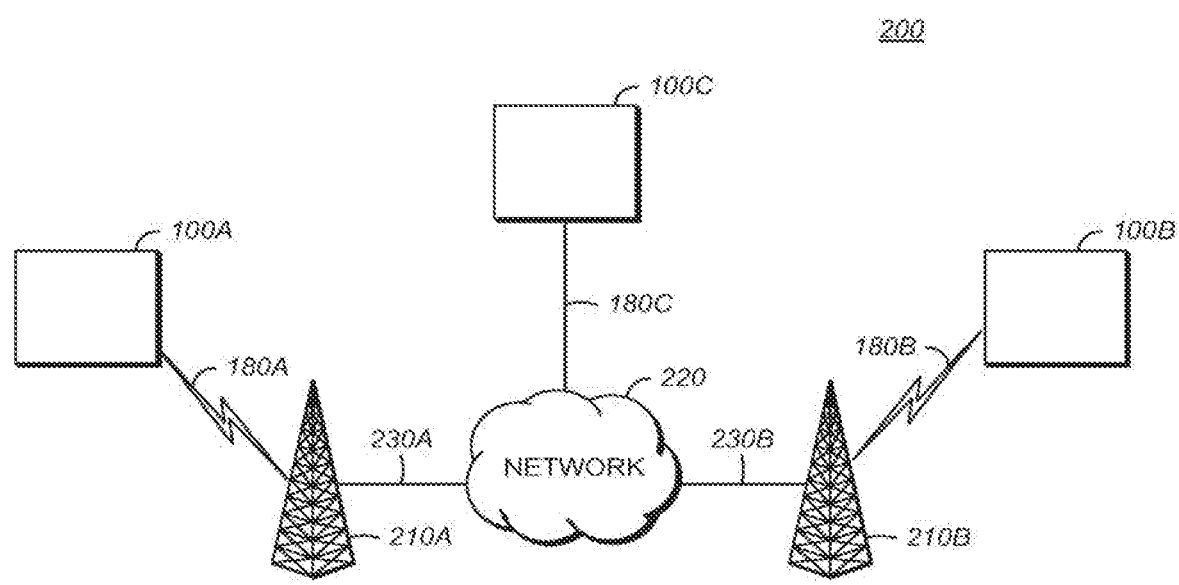
FIG. 2 is a diagram of a computing and communications system in accordance with implementations of this disclosure.

FIG. 2 is a diagram of a computing and communications system 200 in accordance with implementations of this disclosure. The computing and communications system 200 may include one or more computing and communication devices 100A/100B/100C, one or more access points 210A/210B, one or more networks 220, or a combination thereof. For example, the computing and communication system 200 can be a multiple access system that provides communication, such as voice, data, video, messaging, broadcast, or a combination thereof, to one or more wired or wireless communicating devices, such as the computing and communication devices 100A/100B/100C. Although, for simplicity, FIG. 2 shows three computing and communication devices 100A/100B/100C, two access points 210A/210B, and one network 220, any number of computing and communication devices, access points, and networks can be used.

A computing and communication device 100A/100B/100C can be, for example, a computing device, such as the computing device 100 shown in FIG. 1. For example, as shown the computing and communication devices 100A/100B may be user devices, such as a mobile computing device, a laptop, a thin client, or a smartphone, and computing and the communication device 100C may be a server, such as a mainframe or a cluster. Although the computing and communication devices 100A/100B are described as user devices, and the computing and communication device 100C is described as a server, any computing and communication device may perform some or all of the functions of a server, some or all of the functions of a user device, or some or all of the functions of a server and a user device.

Each computing and communication device 100A/100B/100C can be configured to perform wired or wireless communication. For example, a computing and communication device 100A/100B/100C can be configured to transmit or receive wired or wireless communication signals and can include a user equipment (UE), a mobile station, a fixed or mobile subscriber unit, a cellular telephone, a personal computer, a tablet computer, a server, consumer electronics, or any similar device. Although each computing and communication device 100A/100B/100C is shown as a single unit, a computing and communication device can include any number of interconnected elements.

Each access point 210A/210B can be any type of device configured to communicate with a computing and communication device 100A/100B/100C, a network 220, or both via wired or wireless communication links 180A/180B/180C. For example, an access point 210A/210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A/210B is shown as a single unit, an access point can include any number of interconnected elements.

The network 220 can be any type of network configured to provide services, such as voice, data, applications, voice over internet protocol (VoIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP) the Hyper Text Transport Protocol (HTTP), or a combination thereof.

The computing and communication devices 100A/100B/100C can communicate with each other via the network 220 using one or more a wired or wireless communication links, or via a combination of wired and wireless communication links. For example, as shown the computing and communication devices 100A/100B can communicate via wireless communication links 180A/180B, and computing and communication device 100C can communicate via a wired communication link 180C. Any of the computing and communication devices 100A/100B/100C may communicate using any wired or wireless communication link, or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A/210B can communicate with the network 220 via one or more types of wired or wireless communication links 230A/230B. Although FIG. 2 shows the computing and communication devices 100A/100B/100C in communication via the network 220, the computing and communication devices 100A/100B/100C can communicate with each other via any number of communication links, such as a direct wired or wireless communication link.

Other implementations of the computing and communications system 200 are possible. For example, in an implementation the network 220 can be an ad-hock network and can omit one or more of the access points 210A/210B. The computing and communications system 200 may include devices, units, or elements not shown in FIG. 2. For example, the computing and communications system 200 may include many more communicating devices, networks, and access points.

Figure 3:
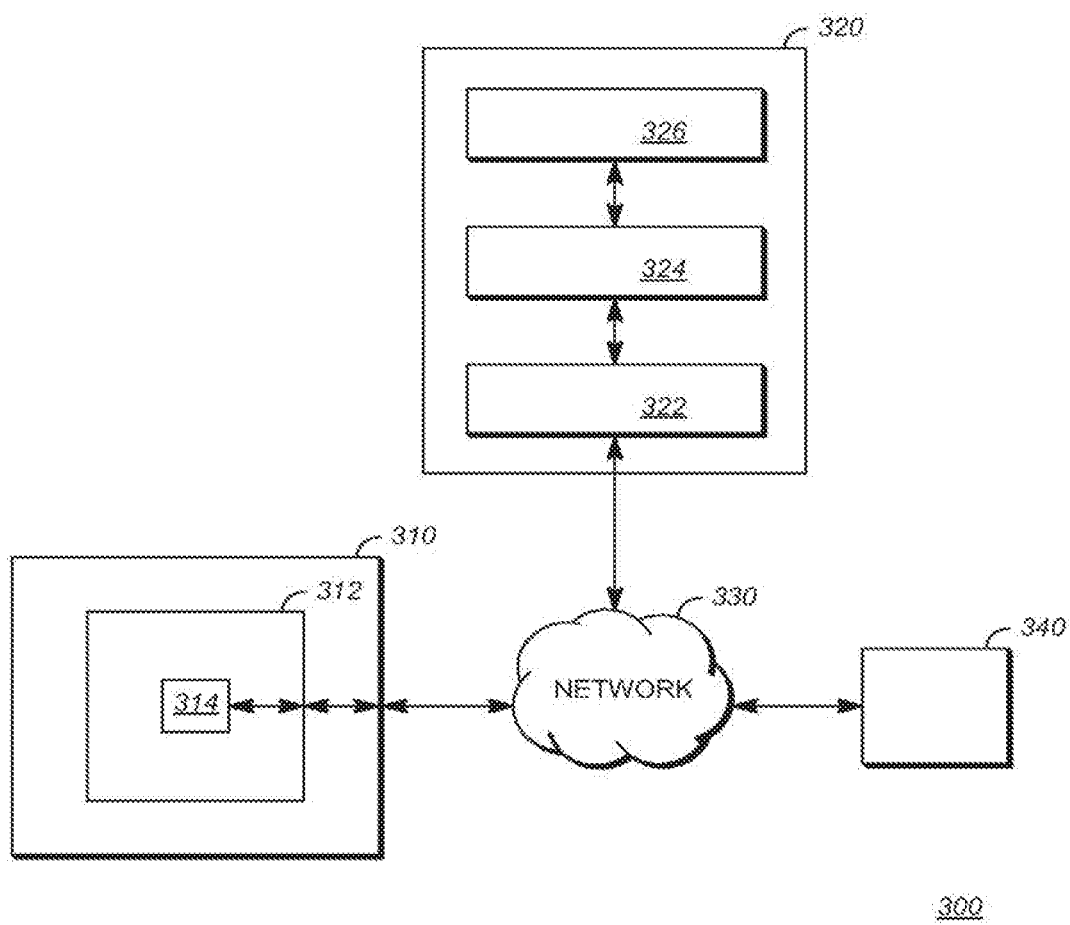
FIG. 3 is a diagram of a communication system for a networked application in accordance with implementations of this disclosure.

FIG. 3 is a diagram of a communication system for a networked application 300 in accordance with implementations of this disclosure. Executing the networked application 300 may include a user device 310, which may be a computing device, such as the computing device 100 shown in FIG. 1 or the computing and communication devices 100A/100B shown in FIG. 2, communicating with a server 320, which may be a computing device, such as the computing device 100 shown in FIG. 1 or computing and communication device 100C shown in FIG. 2, via a network 330, such as the network 220 shown in FIG. 2.

In some implementations, the server 320 may execute a portion or portions of the networked application 300, which may include, for example, generating, modifying, and storing documents and information related to the documents, such as metadata, and providing information for displaying and interacting with the networked application 300 to the user device 310. In some implementations, the server 320 may include one or more logical units 322/324/326. For example, the server 320 may include a web server 322 for receiving and processing requests, such as HTTP requests, from user devices; an application server 324 for executing applications, such as a spreadsheet application or a word processing application; and a database 326 for storing and managing data, such as documents or information about documents, such as metadata. In some implementations, the server 320 may provide information for the networked application 300 to the user device 310 using one or more protocols, such as HyperText Markup Language (HTML), Cascading Style Sheets (CSS), Extensible Markup Language (XML), or JavaScript Object Notation (JSON).

The user device 310 may execute a portion or portions of the networked application 300. For example, the user device 310 may execute a local application 312, such as a browser application, which may receive information from the server 320 and may present a representation of an interface 314 for displaying the networked application 300 and user interactions therewith. For example, the user device 310, may execute a browser application, the browser application may send a request, such as an HTTP request, for the networked application 300 to the server 320, the browser may receive information for presenting the networked application 300, such as HTML and XML data, and the browser may present an interface for the networked application 300. The user device 310 may execute portions of the networked application 300, which may include executable instructions, such as JavaScript, received from the server 320. The user device 310 may receive user input for the networked application 300, may update the interface 314 for the networked application 300 in response to the user input, and may send information for the networked application 300, such as information indicating the user input, to the server 320.

In some implementations, a portion or portions of the networked application may be cached at the user device 310. For example, the user device 310 may execute a portion or portions of the networked application 300 using information previously received from the server 320 and stored on the user device 310. Although the user device 310 and the server 320 are shown separately, they may be combined. For example, a physical device, such as the computing device 100 shown in FIG. 1 may execute the user device 310 as a first logical device and may execute the server 320 as a second logical device.

In some implementations, the networked application 300 may generate files, folders, or documents, such as spreadsheets or word processing documents. The files, folders, or documents, may be created and stored on the user device 310, the server 320, or both. For example, a document may be created and stored on the server 320 and a copy of the document may be transmitted to the user device 310. Modifications to the document may be made on the user device 310 and transmitted to the server 320. In another example, a document may be created and stored on the user device 310 and the document, or modifications to the document, may be transmitted to the server 320.

In some implementations, a networked application, or an element thereof, may be accessed by multiple user devices. For example, the networked application 300 may be executed by a first user device 310 in communication with the server 32, and a document may be stored at the server 320. The networked application 300 may be executed by a second user device 340, which may be a computing device, such as the computing device 100 shown in FIG. 1 or the computing and communication devices 100A/100B shown in FIG. 2, a user may input modifications to the document at the second user device 340, and the modifications may be saved to the server 320.

In some implementation, a networked application, or an element thereof, may be collaboratively accessed by multiple user devices. For example, a first user device 310 may execute a first instance of the networked application 300 in communication with the server 320, and a document may be stored at the server 320. The first user device 310 may continue to display or edit the document. The second user device 340 may concurrently, or substantially concurrently, execute a second instance of the networked application 300, and may display or edit the document. User interactions with the document at one user device may be propagated to collaborating user devices. For example, one or both of the user devices 310/340 may transmit information indicating user interactions with the document to the server 320, and the server may transmit the information, or similar information, to the other user device 310/340. Although FIG. 3 shows two user devices, any number of user devices may collaborate. User interactions with the networked application 300 at one user device may be propagated to collaborating user devices in real-time, or near real-time. Some user interactions with the networked application 300 may not be transmitted to the server 320 and may not be propagated to the collaborating user devices.

Figure 4:
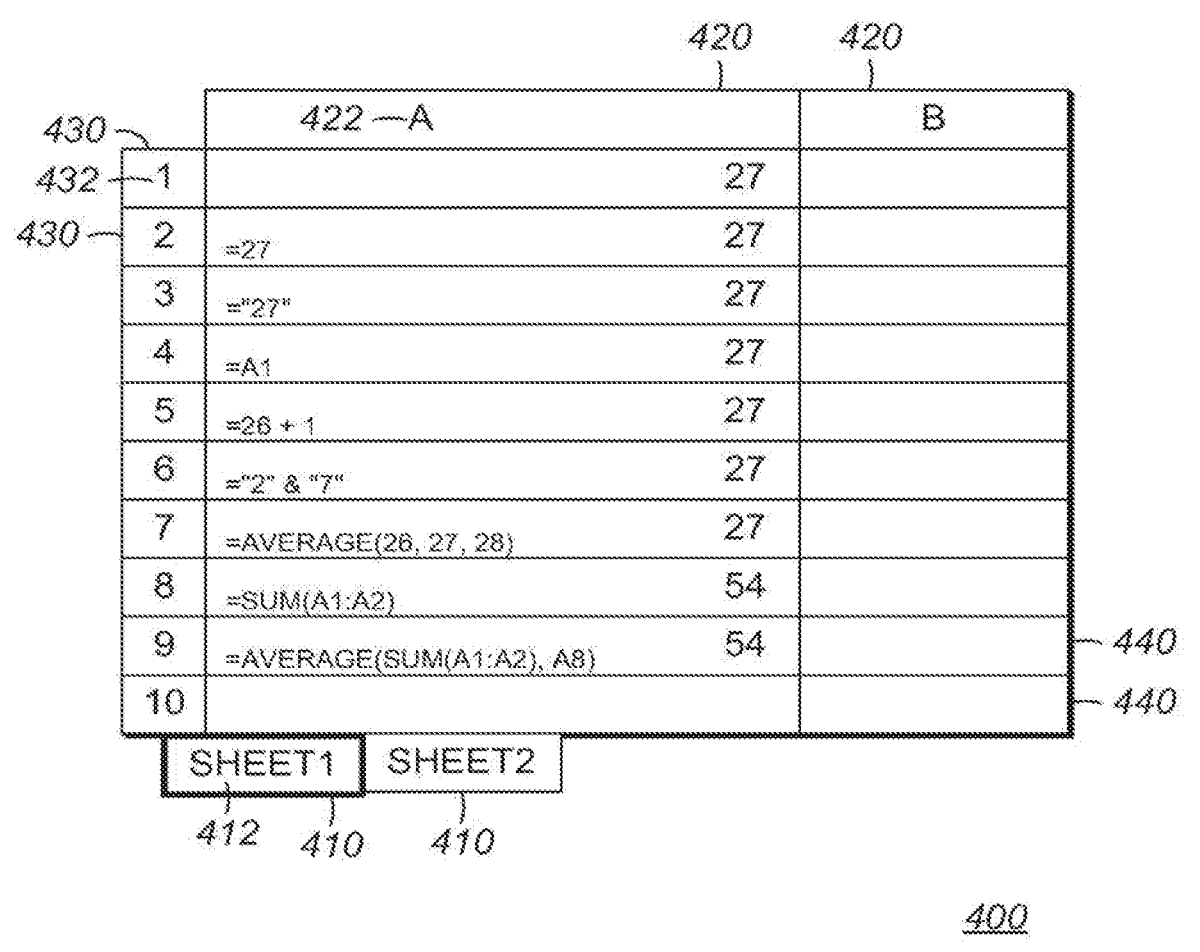

FIG. 4 is a diagram of a representation of spreadsheet information as an electronic spreadsheet 400 in an electronic spreadsheet application in accordance with some implementations of this disclosure. In some implementations, the electronic spreadsheet application may be an application executed on a computing device, such as the computing device 100 shown in FIG. 1. In some implementations, the electronic spreadsheet application may be a networked application, such as the networked application 300 shown in FIG. 3, which may be executed, in part or in whole, on one or more computing device, such as the computing device 100 shown in FIG. 1 or the computing and communication devices 100A/100B/100C shown in FIG. 2.

In an electronic spreadsheet 400, spreadsheet information may be represented in cells arranged in rows and columns on sheets. Each sheet 410 in a spreadsheet may be identified by a sheet identifier 412, such as a sheet name, for example, 'Sheet1'. Each column 420 in a sheet 410 may be identified in the sheet 410 by a column identifier 422, such as a column letter, for example, 'A', and may be identified in other sheets by a combination of a sheet identifier 412 and a column identifier 422. Each row 430 in a sheet 410 may be identified in the sheet 410 by a row identifier 432, such as a row number, for example, '1', and may be identified in other sheets based on a combination of a sheet identifier 412 and a row identifier 432. Each cell 440 in a sheet 410 may be identified in the sheet 410 by a combination of a column identifier 422 and a row identifier 432, for example, 'A1', and may be identified in other sheets by a combination of a sheet identifier 412, a column identifier 422, and a row identifier 432. For example, as shown, the cell in the first column (A) and the first row (1) on the first sheet (Sheet1) may be identified as 'Sheet1!A1'. Although FIG. 4 shows a scheme for identifying cells, columns, rows, and sheets, any other identification scheme capable of identifying cells, columns, rows, sheets, or any combination thereof may be used.

The spreadsheet information may include discrete values, such as a text string, a numeric value, or any other type of discrete data, and the electronic spreadsheet 400 may display the discrete data. For example, as shown, the cell A1 includes the discrete value '27' and the electronic spreadsheet 400 displays '27' in the cell.

The spreadsheet information may include functional information, such as a formula, and the electronic spreadsheet 400 may display the formula, a result of the formula (display value), or both. For clarity in FIG. 4, for a cell that includes a formula, the formula is shown in small font on the left side of the cell and the result of the formula (display value) is shown in normal font on the right side of the cell.

A formula may include formula elements, such as a value, a string, a pointer, a function, or a combination of values, strings, pointers, and functions.

In some implementations, a formula may include a discrete value. For example, as shown, the cell A2 includes the formula '=27', and the electronic spreadsheet displays the value ('27') as the result of the formula in the cell.

In some implementations, a formula may include a text string. For example, as shown the cell A3 includes the formula '="27"', and the electronic spreadsheet displays the string ('27') as the result of the formula in the cell.

In some implementations, a formula may include a pointer to another cell. For example, as shown, the cell A4 includes the formula '=A1', and the electronic spreadsheet displays the value of the cell A2 as the result of the formula in the first cell A1.

In some implementations, a formula may include an operator, which may be a mathematical operator, such as the addition operator (+) or the subtraction operator (−), or a string operator, such as the string concatenation operator (&). For example, as shown, the cell A5 includes the formula '=26+1' and the electronic spreadsheet displays the result of adding 26 and 1 ('27') as the result of the formula in the cell. In another example, as shown, the cell A6 includes the formula '="2" & "7"', and the electronic spreadsheet displays the result of concatenating 7 to 2 as the result ('27') of the formula in the cell.

In some implementations, a formula may include a function, such as the summation function (SUM) or the average function (AVERAGE). For example, as shown, the cell A7 includes the formula '=AVERAGE(26, 27, 28)' and the electronic spreadsheet displays the average of 26, 27, and 28 as the result ('27') of the formula in the cell.

In some implementations, a function may accept a reference to a cell or range of cells as an argument. For example, as shown, the cell A8 includes the formula '=SUM(A1:A2)', and an electronic spreadsheet displays the sum of the values in the cells A1 through A2 as a result ('54') of the formula in the cell.

In some implementations, a function may accept a result of a function as an argument. For example, as shown, the cell A9 includes the formula '=AVERAGE(SUM(A1A2), A8)', and an electronic spreadsheet displays the average of sum of the values in the cells A1 through A2 and the value in cell A8 as a result ('54') of the formula in the cell.

In some implementations, a function, such as the INDIRECT function, may accept a string as an argument, may identify a reference to another cell, or a range of cells, based on the string, and may return the reference to the other cell or range of cells. In some implementations, identifying the reference may include string concatenation. For example, a cell may include the formula '=INDIRECT(A & "1")', the electronic spreadsheet application may compute the result of the INDIRECT function as returning a pointer to cell A1.

Figure 5:
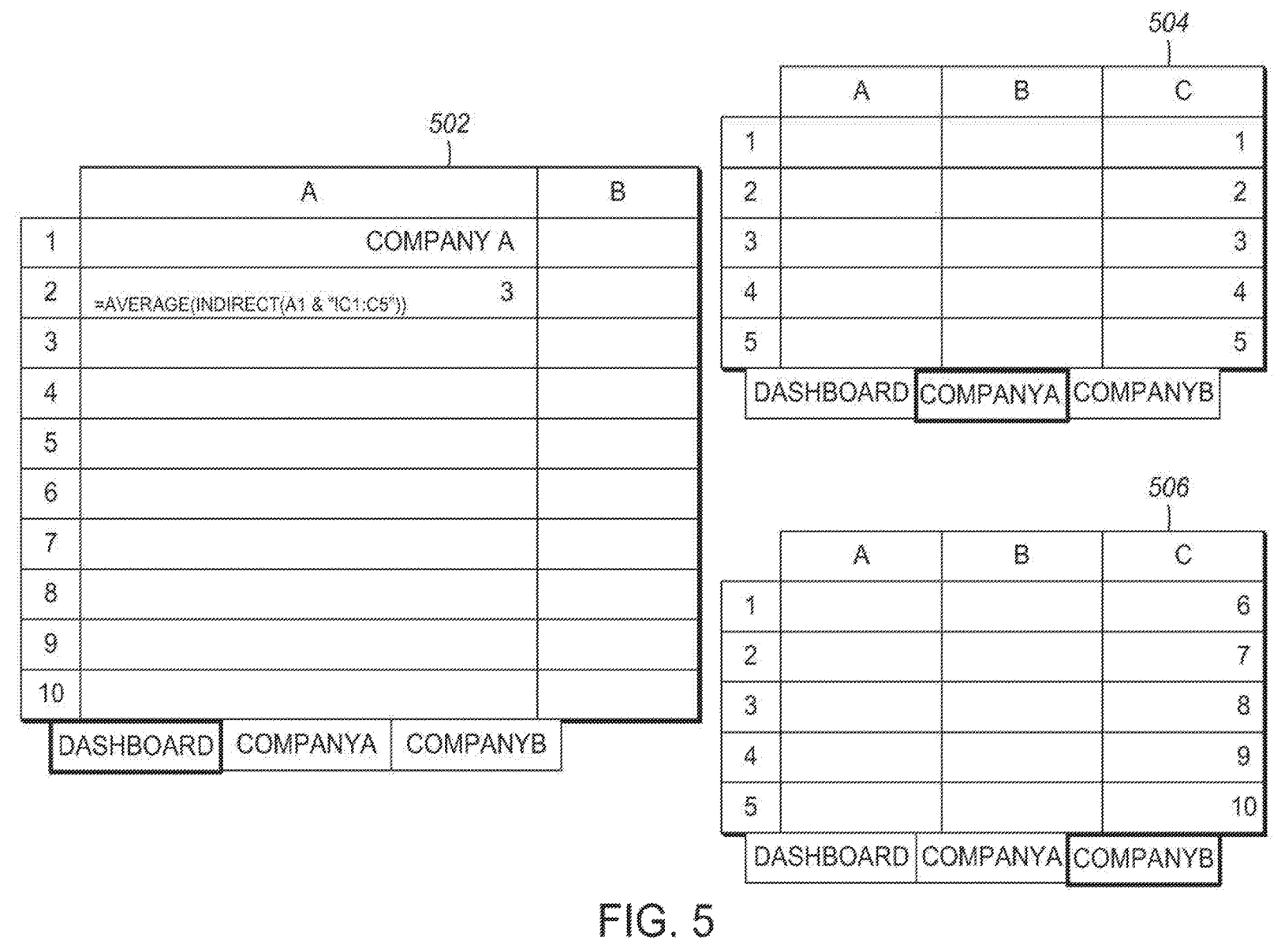

FIG. 5 is a diagram of a representation of spreadsheet information as an electronic spreadsheet in an electronic spreadsheet application using the INDIRECT function in accordance with implementations of this disclosure. In the example shown in FIG. 5, the INDIRECT function is used for analyzing financial information for multiple companies. In FIG. 5, the electronic spreadsheet includes a first sheet 502, a second sheet 504, and a third sheet 506. The second sheet 504 includes information related to a first company (CompanyA) and is associated with the sheet identifier 'CompanyA', which may be based on, for example, a stock ticker associated with CompanyA. The third sheet 506 includes information related to a second company (CompanyB) and is associated with the sheet identifier 'CompanyB', which may be based on, for example, a stock ticker associated with CompanyB. The information in the second sheet 504 and the third sheet 506 may be arranged to conform to a defined structure. For example, as shown, cells in the range C1:C5 on the second sheet 504 include discrete numerical values representing quarterly earnings for CompanyA, and cells in the range C1:C5 on the third sheet 506 include discrete numerical values representing quarterly earnings for CompanyB.

The cell A1 on the first sheet 502 includes a discrete string value indicating the sheet identifier 'CompanyA' associated with the second sheet 502. The cell A2 on the first sheet 502 includes the formula '=AVERAGE(INDIRECT(A1 & "!C1:C5"))'. The electronic spreadsheet application may compute the INDIRECT function as returning a reference to the range 'CompanyA!C1:C10' and may compute the AVERAGE function as returning the average of the cells C1 through C10 on the sheet second sheet 504 as the average quarterly earnings for CompanyA. Although not shown in FIG. 5, the value in the cell A1 on the first sheet 502 may be changed to indicate CompanyB and the electronic spreadsheet application may re-compute the result of the formula in A2 to determine the average quarterly earnings for CompanyB.

In some implementations, an electronic spreadsheet application may include a function, such as an EVAL function, that may pass functional spreadsheet data by reference. For example, the EVAL function may accept a string as an argument, may identify a formula based on the string, and may return a result of the formula.

FIG. 6 is a diagram of a representation of spreadsheet information as an electronic spreadsheet in an electronic spreadsheet application using the EVAL function in accordance with implementations of this disclosure. In the example shown in FIG. 6, the EVAL function is used for analyzing financial information for multiple companies. In FIG. 6, the electronic spreadsheet includes a first sheet 602, a second sheet 604, and a third sheet 606. The second sheet 604 includes information related to a first company (CompanyA) and is associated with the sheet identifier 'CompanyA', which may be based on, for example, a stock ticker associated with CompanyA. The third sheet 606 includes information related to a second company (CompanyB) and is associated with the sheet identifier 'CompanyB', which may be based on, for example, a stock ticker associated with CompanyB. The information in the second sheet 604 and the third sheet 606 may be arranged to conform to a defined structure. For example, as shown, cells in the range C1:C5 on the second sheet 604 include discrete numerical values representing quarterly earnings for CompanyA, and cells in the range C1:C5 on the third sheet 606 include discrete numerical values representing quarterly earnings for CompanyB.

The cell A1 on the first sheet 602 includes a discrete string value indicating the sheet identifier 'CompanyA' associated with the second sheet 502. The cell B1 on the first sheet 602 includes a discrete string value indicating the AVERAGE function. The cell A2 on the first sheet 602 includes the formula '=EVAL(B1 & "(" & A1 & "!C1:C5"))'. The electronic spreadsheet application may compute the EVAL function as identifying the formula '=AVERAGE(CompanyA!C1:C5)' and may return the average of the cells C1 through C10 on the second sheet 604 as the quarterly earnings for CompanyA. Although not shown in FIG. 6, the value in the cell A1 may be changed to indicate another company, such as CompanyB, the value of the cell B1 may be changed to another function, such as the MEDIAN function, and the electronic spreadsheet application may re-compute the formula in A2 as identifying the formula '=MEDIAN(CompanyB!C1:C5)' and may return the median earnings for CompanyB. In another example, although not shown in FIG. 6, the value in the cell B1 may be changed to another function, such as MAX, and the electronic spreadsheet application may re-compute the formula in A2 as identifying the formula '=MAX(CompanyB!C1:C5)' and may return the maximum earnings for CompanyB. In some implementations, a cell, such as B1 may include list data, and the value of the cell may be selected from a list of values. In some implementations, a cell, such as B1, may include a custom function.

Figure 7:
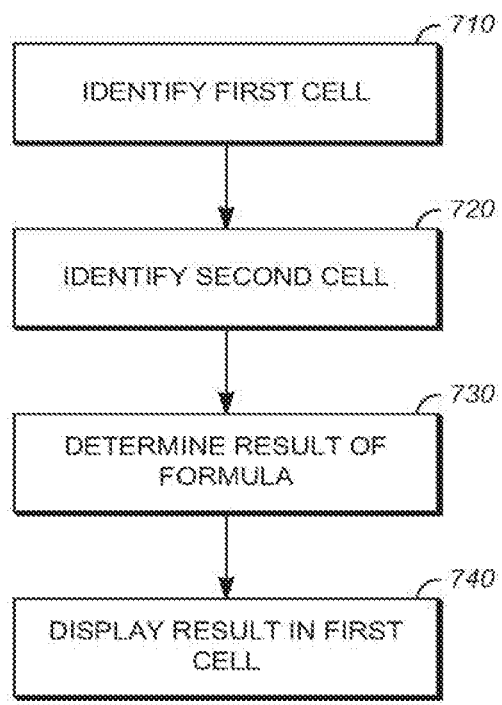
FIG. 7 is a diagram of passing functional spreadsheet data by reference in accordance with implementations of this disclosure.

FIG. 7 is a diagram of passing functional spreadsheet data by reference in accordance with some implementations of this disclosure. Passing functional spreadsheet data by reference may include identifying a first cell of a spreadsheet at 710, identifying a second cell of a spreadsheet at 720, determining a result of a formula at 730, and displaying the result at 740. Although not explicitly shown, in some implementations, passing functional spreadsheet data by reference may include generating a dynamic calculation graph. The calculation graph may include a set of nodes and directed edges. Each edge may indicate a formula reference, and each node may indicate a parse tree of a respective formula. Calculating a function, such as the INDIRECT function, may include modifying the edges of the graph. Passing functional spreadsheet data by reference, using, for example, a function, such as the EVAL function, may include evaluating a new edge and evaluating a new subtree.

Identifying the first cell at 710 may include identifying, in a spreadsheet, a cell that includes a formula that includes a call to the EVAL function wherein the EVAL function call includes a cell identifier associated with second cell in the spreadsheet as an argument. For example, the first cell may be cell A1 and may include the function '=EVAL(B1&"(5, 6)")', and B1 may be a cell identifier associated with the second cell in the spreadsheet.

Identifying the second cell at 720 may include identifying, in the spreadsheet, a cell associated with the cell identifier identified at 710. The second cell may include functional information, such as a function identifier. For example, the second cell may include the function identifier 'AVERAGE'.

Determining a result of the formula at 730 may include calculating a result of the EVAL function, which may include generating a string incorporating the functional information passed by reference, such as the value of the second cell, and calculating a result of the formula, or partial formula, indicated by the string.

The result of the formula in the first cell may be displayed at 740. The result of the formula in the first cell may be the result of calculating the formula in the first cell.

Other implementations of the diagram of passing functional spreadsheet data by reference as shown in FIG. 7 are available. In implementations, additional elements of passing functional spreadsheet data by reference can be added, certain elements can be combined, and/or certain elements can be removed. For example, in some implementations, the first cell may include additional functional elements.

Passing functional spreadsheet data by reference, or any portion thereof, can be implemented in a device, such as the computing device 100 shown in FIG. 1. For example, a processor, such as the processor 140 shown in FIG. 1, can implement passing functional spreadsheet data by reference, or any portion thereof, using instruction, such as the instructions 160 shown in FIG. 1, stored on a tangible, non-transitory, computer readable media, such as the memory 150 shown in FIG. 1.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIGS. 1-3.

Further, for simplicity of explanation, although the figures and descriptions herein may include sequences or series of steps or stages, elements of the methods disclosed herein can occur in various orders or concurrently. Additionally, elements of the methods disclosed herein may occur with other elements not explicitly presented and described herein. Furthermore, not all elements of the methods described herein may be required to implement a method in accordance with the disclosed subject matter.

The implementations of the computing and communication devices (and the algorithms, methods, or any part or parts thereof, stored thereon or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the computing and communication devices do not necessarily have to be implemented in the same manner.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A method of processing data represented as an electronic spreadsheet, the method comprising:

identifying a first cell of a first sheet of the electronic spreadsheet, the first cell having a first cell identifier and including a formula having a first function call, the first function call including an argument comprising a plurality of formula elements, wherein the plurality of formula elements comprise a second cell identifier and a first string;

identifying, based on the second cell identifier, a second cell associated with a function identifier;

identifying a value of the second cell, wherein the value of the second cell is a second string corresponding to a function name that corresponds to a second function call, the second string associated with a second sheet of the electronic spreadsheet;

determining, by a processor, a result of the formula using the function identifier, the first string and the second string, wherein the determining comprises:

performing the first function call to convert the second string into the second function call; and performing the second function call to derive the result of the formula, the second function call is performed using the function identifier, the first string and one or more values that each correspond to one of one or more cells of a plurality of cells of the second sheet of the electronic spreadsheet; and causing the result of the formula to be displayed in the first cell of the first sheet of the electronic spreadsheet.

2. The method of claim 1, wherein the second cell is one of a plurality of cells of the first sheet of the electronic spreadsheet or is one of the plurality of cells of the second sheet of the electronic spreadsheets.

3. The method of claim 1, wherein determining the result of the formula comprises generating a part of the formula by concatenating the function identifier and the first string.

4. The method of claim 1, wherein the plurality of formula elements includes a third cell identifier associated with a third cell, and wherein determining the result of the formula includes identifying the third cell based on the third cell identifier.

5. The method of claim 1, wherein the plurality of formula elements includes a third cell identifier associated with a range of the one or more cells of the plurality of cells of the second sheet, and wherein determining the result of the formula includes calculating a result of performing the second function call indicated by the function name for each cell in the range of the one or more cells of the plurality of cells of the second sheet using a value of the respective cell as an argument to the second function call indicated by the function name.

6. The method of claim 1, wherein the first function call is an EVAL function and the argument includes the second cell identifier and the first string.

7. The method of claim 6, further comprising:
modifying a dynamic calculation graph of the formula to include a new edge and a new subtree.

8. An apparatus for use in processing data represented as an electronic spreadsheet, the apparatus comprising:
a memory; and
a processor, coupled to the memory, to perform operations comprising:
identifying a first cell of a first sheet of the electronic spreadsheet, the first cell having a first cell identifier and including a formula having a first function call, the first function call including an argument comprising a plurality of formula elements, wherein the plurality of formula elements comprise a second cell identifier and a first string;

identifying, based on the second cell identifier, a second cell associated with a function identifier;

identifying a value of the second cell, wherein the value of the second cell is a second string corresponding to a function name that corresponds to a second function call, the second string associated with a second sheet of the electronic spreadsheet;

determining, by a processor, a result of the formula using the function identifier, the first string and the second string, wherein the determining comprises:

performing the first function call to convert the second string into the second function call; and performing the second function call to derive the result of the formula, the second function call is performed using the function identifier, the first string and one or more values that each correspond to one of one or more cells of a plurality of cells of the second sheet of the electronic spreadsheet; and causing the result of the formula to be displayed in the first cell of the first sheet of the electronic spreadsheet.

9. The apparatus of claim 8, wherein the second cell is one of a plurality of cells of the first sheet of the electronic spreadsheet or is one of the plurality of cells of a second sheet of the electronic spreadsheets.

10. The apparatus of claim 8, wherein determining the result of the formula comprises generating a part of the formula by concatenating the function identifier and the first string.

11. The apparatus of claim 8, wherein the plurality of formula elements includes a third cell identifier associated with a third cell, and wherein determining the result of the formula includes identifying the third cell based on the third cell identifier.

12. The apparatus of claim 8, wherein the plurality of formula elements includes a third cell identifier associated with a range of the one or more cells of the plurality of cells of the second sheet, and wherein determining the result of the formula includes calculating a result of performing the second function call indicated by the function name for each cell in the range of the one or more cells of the plurality of cells of the second sheet using a value of the respective cell as an argument to the second function call indicated by the function name.

13. The apparatus of claim 8, wherein the first function call is an EVAL function and the argument includes the second cell identifier and the first string.

14. The apparatus of claim 13, wherein the operations further comprise:
modifying a dynamic calculation graph of the formula to include a new edge and a new subtree.

15. A non-transitory computer readable medium comprising instructions which when executed by a processor, cause the processor to perform operations comprising:
identifying a first cell of a first sheet of the electronic spreadsheet, the first cell having a first cell identifier and including a formula having a first function call, the first function call including an argument comprising a plurality of formula elements, wherein the plurality of formula elements comprise a second cell identifier and a first string;

identifying, based on the second cell identifier, a second cell associated with a function identifier;

identifying a value of the second cell, wherein the value of the second cell is a second string corresponding to a function name that corresponds to a second function call, the second string associated with a second sheet of the electronic spreadsheet;

determining, by a processor, a result of the formula using the function identifier, the first string and the second string, wherein the determining comprises:

performing the first function call to convert the second string into the second function call; and performing the second function call to derive the result of the formula, the second function call is performed using the function identifier, the first string and one or more values that each correspond to one of one or more cells of a plurality of cells of the second sheet of the electronic spreadsheet; and causing the result of the formula to be displayed in the first cell of the first sheet of the electronic spreadsheet.

16. The non-transitory computer readable medium of claim 15, wherein the second cell is one of a plurality of cells of the first sheet of the electronic spreadsheet or is one of the plurality of cells of a second sheet of the electronic spreadsheets.

17. The non-transitory computer readable medium of claim 15, wherein determining the result of the formula comprises generating a part of the formula by concatenating the function identifier and the first string.

18. The non-transitory computer readable medium of claim 15, wherein the plurality of formula elements includes a third cell identifier associated with a third cell, and wherein determining the result of the formula includes identifying the third cell based on the third cell identifier.

19. The non-transitory computer readable medium of claim 15, wherein the plurality of formula elements includes a third cell identifier associated with a range of the one or more cells of the plurality of cells of the second sheet, and wherein determining the result of the formula includes calculating a result of performing the second function call indicated by the function name for each cell in the range of the one or more cells of the plurality of cells of the second sheet using a value of the respective cell as an argument to the second function call indicated by the function name.

20. The non-transitory computer readable medium of claim 15, wherein the first function call is an EVAL function and the argument includes the second cell identifier and the first string.

21. The non-transitory computer readable medium of claim 20, wherein the operations further comprise:

modifying a dynamic calculation graph of the formula to include a new edge and a new subtree.

\* \* \* \* \*